Aug. 27, 1957

C. J. ROOS 2,804,182

JAMB LINER

Filed Aug. 23, 1955

C. J. Roos
INVENTOR

BY Cashnow&Co.
ATTORNEYS.

Aug. 27, 1957  C. J. ROOS  2,804,182
JAMB LINER
Filed Aug. 23, 1955  7 Sheets-Sheet 2
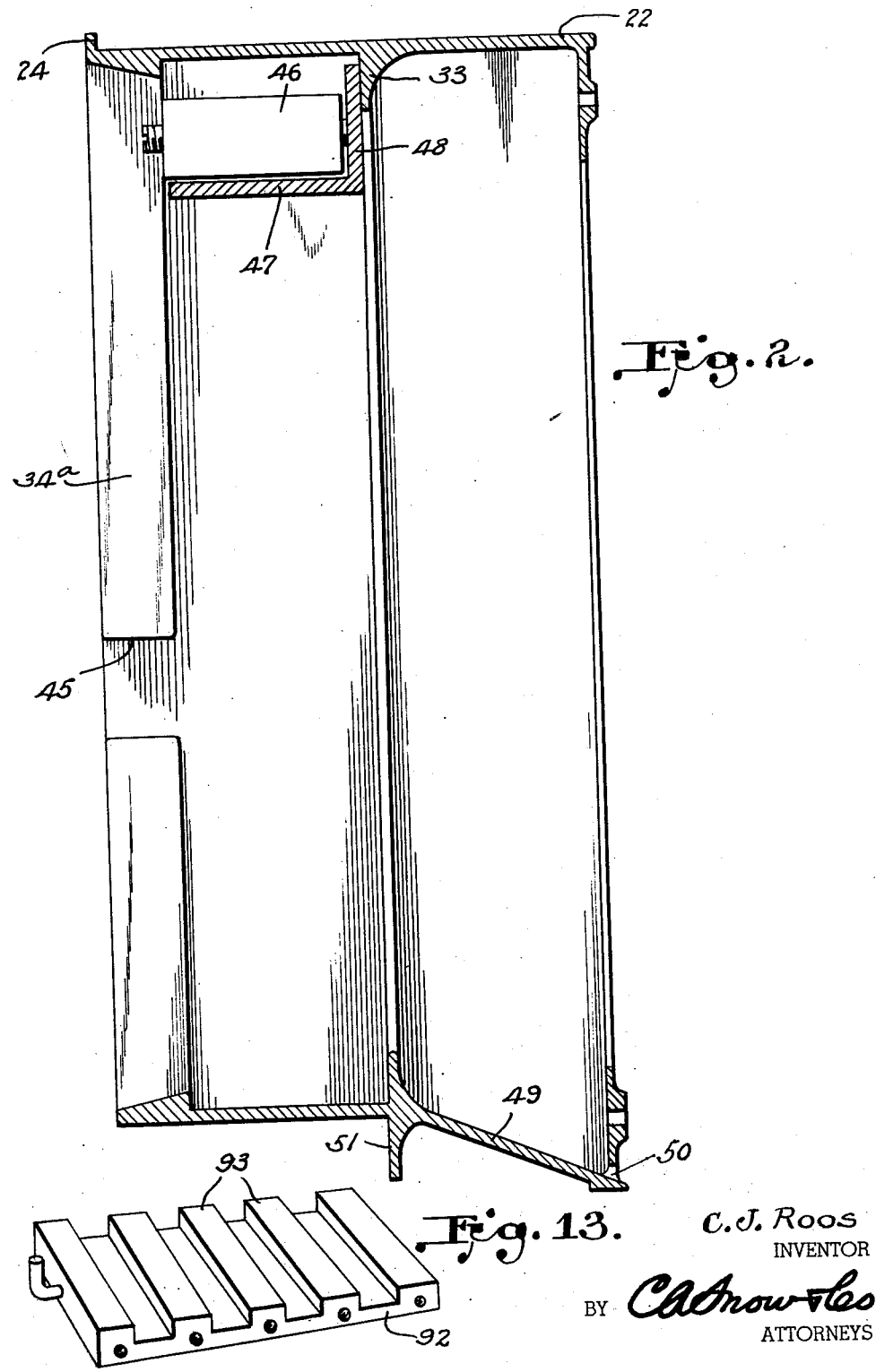
C. J. Roos
INVENTOR
BY
ATTORNEYS.

Aug. 27, 1957  C. J. ROOS  2,804,182
JAMB LINER
Filed Aug. 23, 1955  7 Sheets-Sheet 3
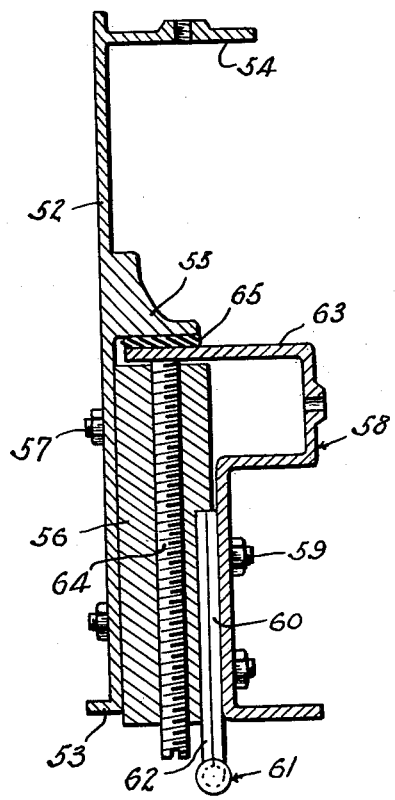
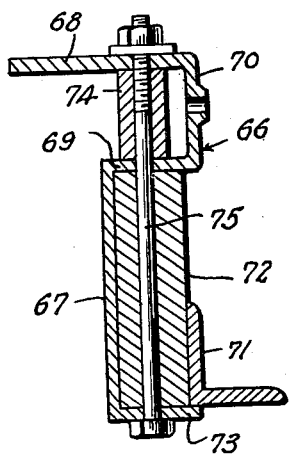
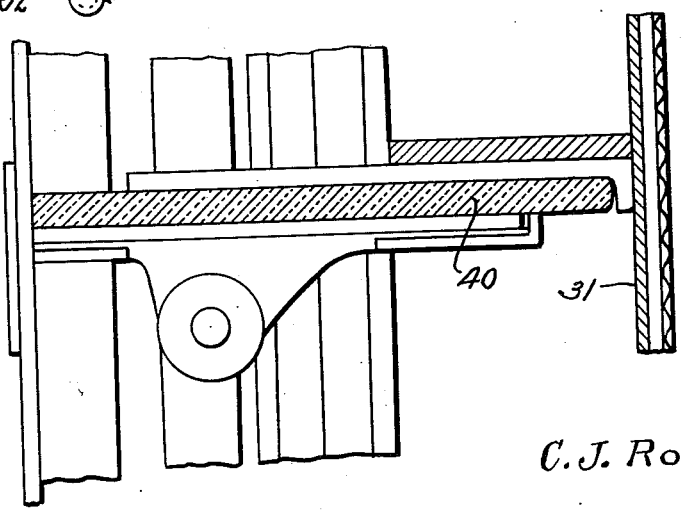
C. J. Roos
INVENTOR
BY
ATTORNEYS.

Aug. 27, 1957
C. J. ROOS
2,804,182
JAMB LINER
Filed Aug. 23, 1955
7 Sheets-Sheet 4
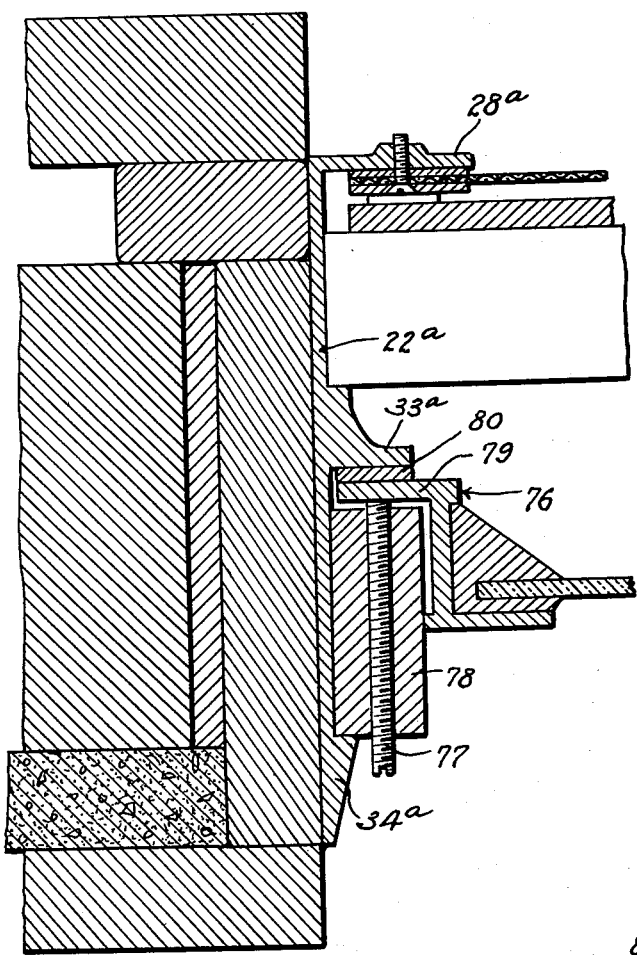
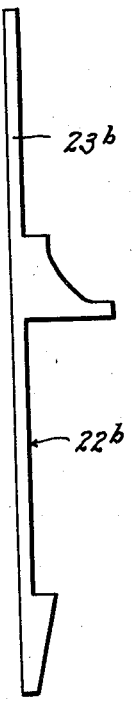
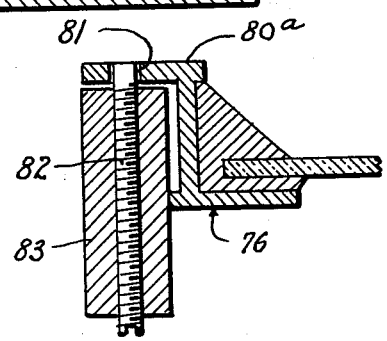
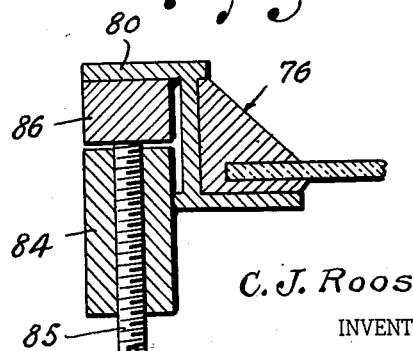
C. J. Roos
INVENTOR Aug. 27, 1957  C. J. ROOS  2,804,182
JAMB LINER Filed Aug. 23, 1955  7 Sheets-Sheet 5

C. J. Roos
INVENTOR
BY *CA Snow & Co.*
ATTORNEYS.

Aug. 27, 1957  C. J. ROOS  2,804,182
JAMB LINER
Filed Aug. 23, 1955  7 Sheets-Sheet 6
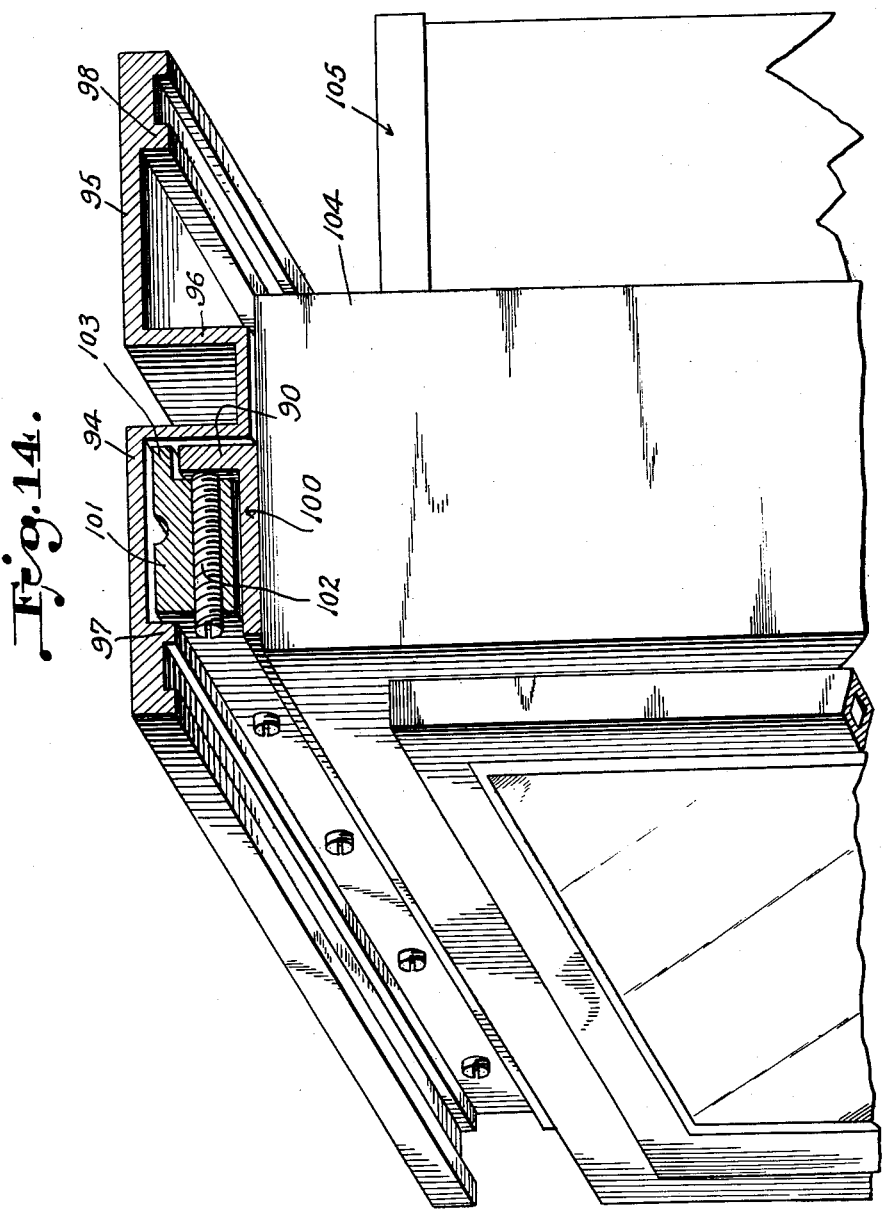
C. J. Roos
INVENTOR
BY *Cashrow &Co.*
ATTORNEYS.

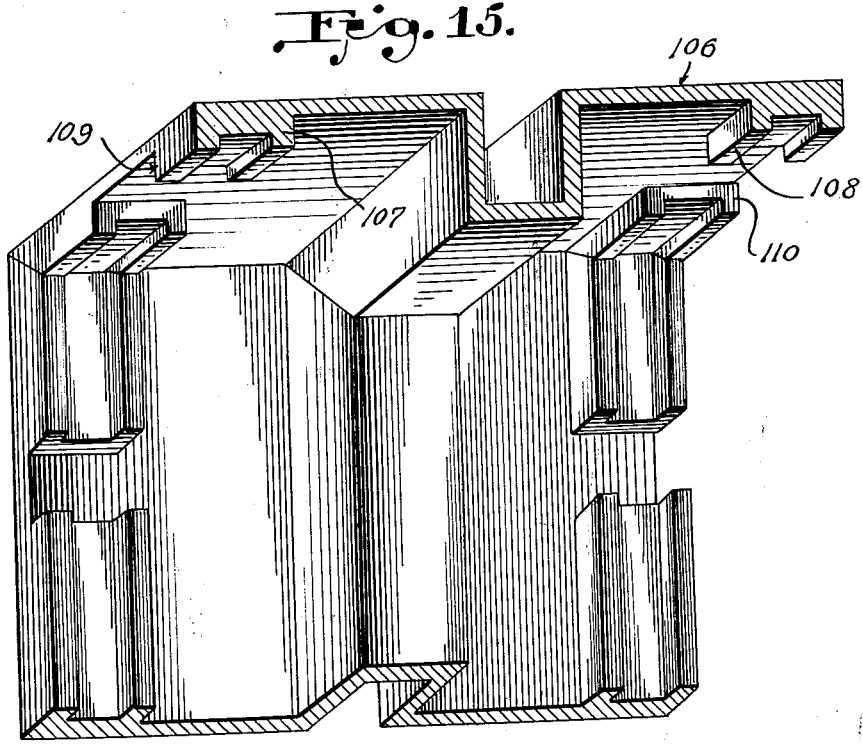
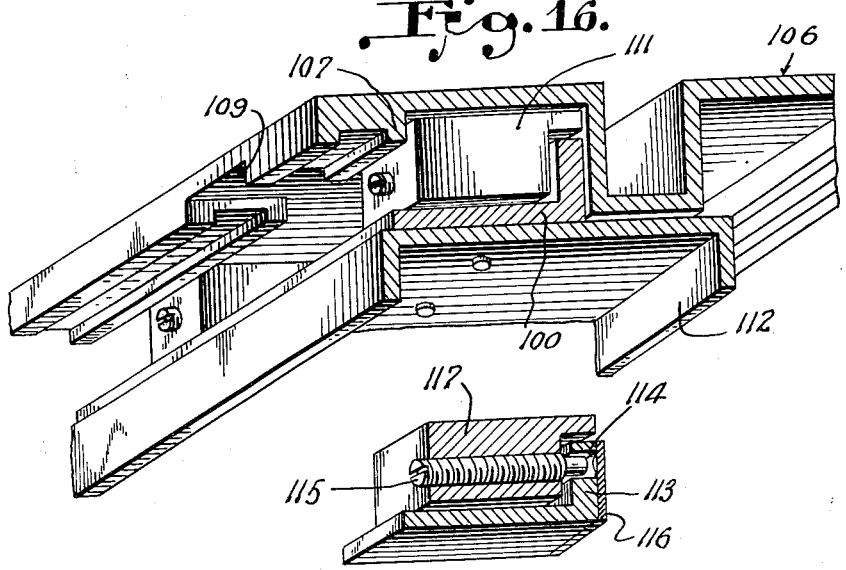

United States Patent Office 2,804,182
Patented Aug. 27, 1957

2,804,182

JAMB LINER

Charles J. Roos, Muskegon, Mich.

Application August 23, 1955, Serial No. 530,037

3 Claims. (Cl. 189—75)

This invention relates to a liner for window openings.

An object of this invention is to provide a metallic liner adapted to be firmly secured in a window opening for tightly holding window sashes and preventing the glass panels from being blown out by undue pressures from the exterior, such as pressures produced by bombs of various types.

A further object of this invention is to provide a jamb liner which may be formed of extruded metal which may be produced in the form of strips secured together at their corners or meeting ends, by suitable fastening means, so that the metallic liner can be produced as a "do it yourself" item.

A further object of this invention is to provide a jamb liner which may be used in combination with a conventional window sash jalousie.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 2 is a vertical section of the liner.

Figure 3 is a horizontal section of the liner with a sash holder hingedly secured thereto.

Figure 4 is a horizontal section of a portion of a jalousie supporting frame.

Figure 5 is a fragmentary vertical section partly in detail, of a jalousie in open position for bracing the shield structure.

Figure 6 is a fragmentary horizontal section of a jamb liner showing a conventional metal sash secured therein.

Figure 7 is a fragmentary horizontal section of a metal sash with a modified form of sash locking means.

Figure 8 is a fragmentary horizontal section of a metal sash with another modified form of sash locking means.

Figure 9 is an end elevation of a modified form of jamb liner.

Figure 13 is a perspective view of a modified form of sash locking means.

Figure 14 is a fragmentary perspective view, partly in section, of a modified form of jamb liner.

Figure 15 is a fragmentary perspective view, partly in section, of another modified form of jamb liner.

Figure 16 is a fragmentary perspective view partly in section, showing the manner of locking the sash holder in the liner.

Figure 17 is a fragmentary perspective view partly in section, of a modified form of sash locking means for use with the liners shown in Figures 14 to 16 inclusive.

Figure 1:
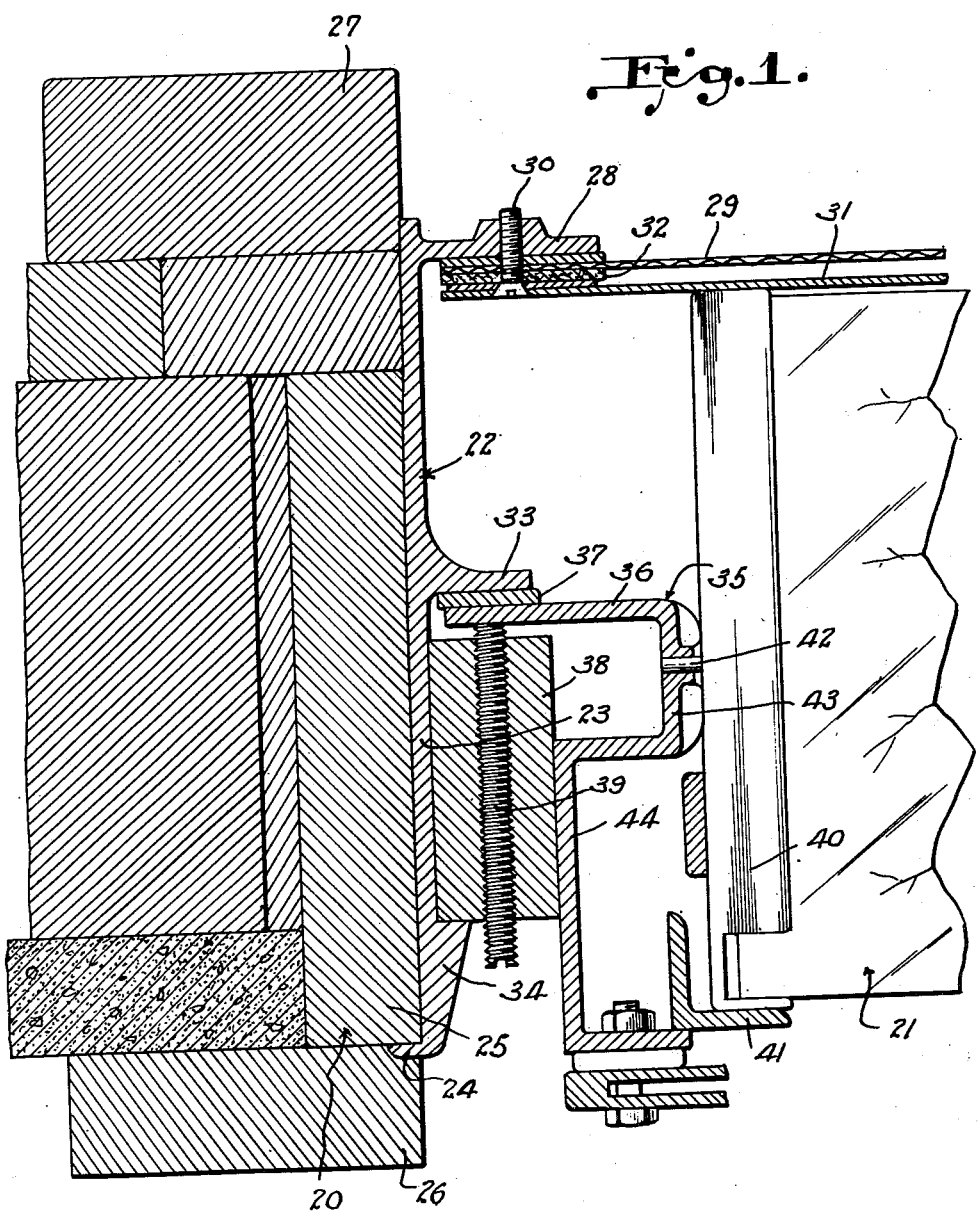
Figure 1 is a horizontal section of a jamb liner constructed according to an embodiment of this invention, showing the device in combination with a jalousie structure.

Referring to the drawings, and first to Figure 1, the numeral 20 designates generally a window opening structure which may be formed of brick, stone, metal, wood or the like. In order to provide means whereby a jalousie structure, generally indicated at 21, may be secured in the opening 20 from the inside of the building, I have provided a jamb liner generally indicated at 22. The jamb liner 22 is formed of a flat plate 23 engageable about the marginal portions of the opening 20. The plate 23 is formed at its inner edge with a right angular locking flange 24 adapted to be firmly secured between adjacent window opening elements 25 and 26. The plate 23 extends outwardly and partly overlies the inner portion of an outer trim strip 27. The plate 22 adjacent the outer portion thereof is formed with a right angular inwardly projecting flange 28, against which a perforate grill 29 is adapted to engage. The grill 29 bears against the inner side of the flange 28 and is secured thereto by fastening members 30.

Imperforate shield 31, constructed in the form of a panel which may be transparent or translucent material, is disposed on the inner side of the grill 29 and is spaced therefrom by means of a gasket 32. The gasket 32 may be formed of asbestos, or other compressible material which will not burn.

The screws 30 hold the grill 29 in place and also extend through the shield or panel 31.

The plate 23 also has formed integral therewith an intermediate flange 33 forming an inner stop member, the purpose for which will be hereinafter described. A second stop member 34 is formed integral with the inner portion of plate 23 and tapers inwardly so as to assume a wedge shape.

A jalousie frame structure, generally indicated at 35, is adapted to be secured between the flange 33 and the stop 34. The jalousie frame 35 includes a flange 36 extending outwardly and confronting the flange 33. A gasket 37 is interposed between the flange 36 of the flange or stop 33.

Clamping block 38 is disposed in the space between the stop members 33 and 34, and a series of clamping screws 39 are threaded through the block 38 and are adapted to bear against the flange 36. The jalousie structure 21 includes pivoted louvers 40 which, when in open position, are dapted to bear at their rear edges against a backing angle member 41. The louvers 40, at their front edges, are adapted to substantially contact with the inner side of the shield 31.

The louvers 40 are pivoted as at 42 on an inwardly offset wall 43 formed in the frame structure 35. The frame structure 35 also includes a flat inwardly projecting plate 44 which bears against the inner side of the clamping block 38.

Referring now to Figure 2, there is disclosed a slightly modified form of this jamb liner, wherein the stop member 34a is formed with a slot 45 through which the clamping blocks 46 are adapted to be extended. In the present form of the invention, the window sash may be secured to an angle member 47 with one side 48 of the angle member bearing against the inner side of the intermediate stop 33. The bottom portion of each jamb liner is formed with a downwardly and outwardly inclined wall 49 having drain openings 50 for draining any water or moisture which enters the space between the flange 28 and the intermediate stop 33.

The lower portion of the jamb liner shown in Figure 2 also includes a downwardly projecting outer flange 51 which may be secured between adjacent window opening elements.

Referring now to Figure 3, there is disclosed another modification of this invention embodying a plate 52 similar to plate 23, having an inner flange 53 and an outer oppositely extending flange 54. The grill and shield are adapted to be secured to flange 54 as shown in Figure 1. The structure shown in Figure 3 is designed particularly for use where a sash or jalousie structure is hingedly mounted in the window opening.

An intermediate stop member 55 is formed integral with plate 52, and a block 56 is secured by fastening means 57 to plate 52 inwardly of stop 55. A jalousie frame structure 58 similar to structure 35 is secured by fastening means 59 to one leaf 60 of a hinge member 61. The other leaf 62 is secured to the inner side of block 56. The flange 63 of the frame 58 is tightly clamped against stop member 55 by means of clamping bolts 64 threaded through block 56, and a gasket 65 is interposed between flange 63 and stop 55.

Referring now to Figure 4, there is disclosed a jalousie frame structure 66 embodying a plate 67 with an outer flange 68 and an intermediate flange 69 connected to outer flange 68 by means of a connecting wall 70. A louver backing angle 71 is secured by suitable fastening means (not shown) to a spacer block 72 disposed between flange 69 and an inner flange 73. A second spacer block 74 is secured between flanges 68 and 69. A bolt 75 extends through flanges 73, 69 and 68 so as to hold the blocks 72 and 74 tightly in position and reinforce the frame structure 66.

Referring now to Figure 5, there is disclosed a fragmentary vertical section showing the manner in which the pivoted louver 40 of a jalousie bears at its outer edge against the inner side of the shield 31.

Referring now to Figure 6, there is disclosed another modification of this invention wherein the jamb liner 22a is similar to that shown in Figure 1, with the exception that the flange 24 is eliminated. The liner 22a is formed with an intermediate stop 33a and an inner stop 34a. A conventional metal sash, generally indicated at 76, is adapted to be clamped against stop 33a by means of clamping bolts 77 extending through blocks 78 which are disposed between stop members 33a and 34a.

The outwardly projecting flange 79 of sash 76 is interposed between the bolts 77 and stop 33a with a gasket 80 interposed between flange 79 and stop 33a.

Referring now to Figure 7, there is disclosed another form of attaching or mounting metal sash 76 in the jamb liner. The flange 80a is provided with a series of openings 81 within which the inner ends of the locking bolts 82 are adapted to loosely engage. The bolts 82 extend through blocks 83. The structure shown in Figure 7 will provide a means for slidably mounting the window sash in the jamb liner.

Referring now to Figure 8, there is disclosed a metal sash 76 adapted to be clamped in the jamb liner wherein the blocks 84 engageable in the jamb liner are relatively narrow. Clamping screws 85 are threaded through the blocks 84 and a smaller block 86 is interposed between flange 80 and the adjacent edge of block 84.

Referring now to Figure 9, there is disclosed a jamb liner 22b similar to liner 22 with the exception that plate 23b does not have the outer flange secured thereon or formed integral therewith. With the liner shown in Figure 9, an angle member may be attached to the outer edge of the plate 23b for holding the shield and grill in proper position.

Figure 10:
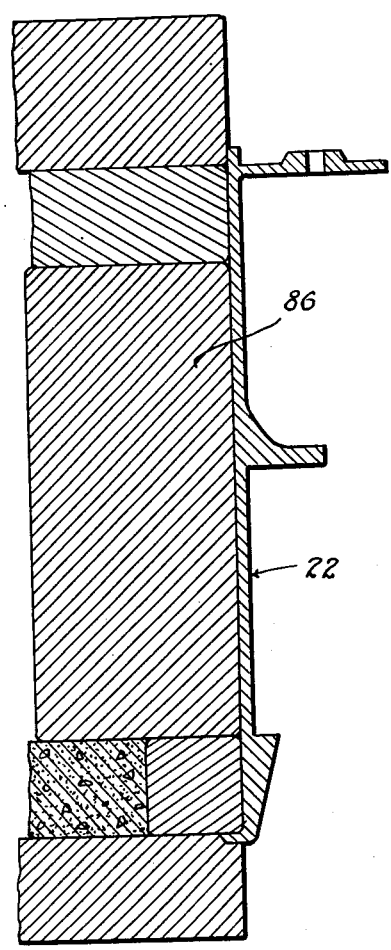
Figure 10 is a fragmentary horizontal section of a jamb liner constructed according to an embodiment of this invention, secured in a window opening.

Referring now to Figure 10, the jamb liner 22 shown therein is identical with the liner shown in Figure 1. The liner is here disclosed as being used with a new building structure having two-by-fours 86 disposed about the margin of the window opening.

Figure 11:
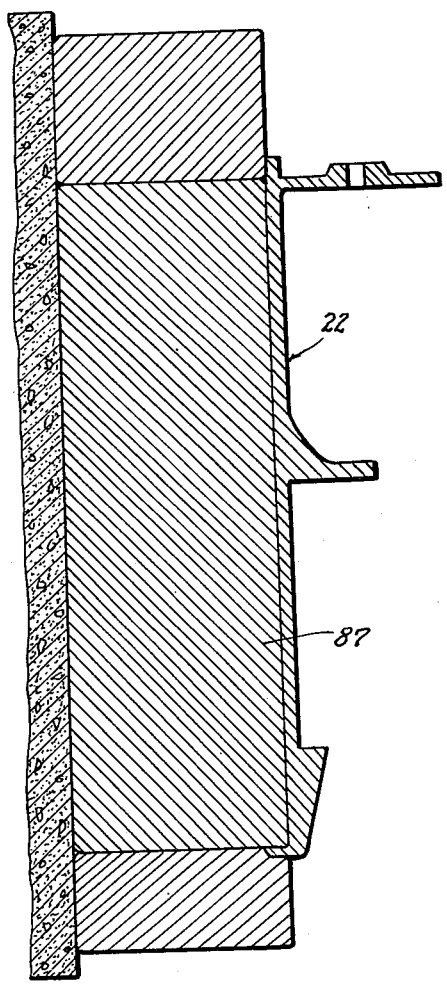
Figure 11 is a view similar to Figure 10, showing the liner secured in a different form of window opening structure.

Referring now to Figure 11, the jamb liner 22 is identical with that shown in Figure 1, but the window opening structure includes a buck frame 87 to which the liner 22 is secured by any suitable fastening means.

Figure 12:
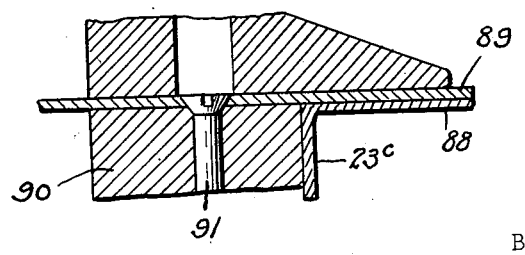
Figure 12 is a fragmentary horizontal section of a modified form of jamb liner.

Referring now to Figure 12, there is disclosed a fragmentary sectional view of a modified form of jamb liner. The liner plate 23c has a relatively thin outer flange 88 integral therewith and flange 88 has fixed thereto a reinforcing plate 89. The plate 89 may be welded or otherwise secured to flange 88, or may be separable therefrom. The plate 89 may be secured to the window opening structure 90 by screws 91, and the fastening members 30 for securing the grill and shield to flange 88 may be threaded into plate 89.

Referring now to Figure 13, there is disclosed a modified form of clamping block 92, which is provided with a plurality of parallel tongues 93. Where the block 92 is used this block is substantially shorter than the distance between the upper and lower portions of the jamb liner, and the inner stop member 34 is provided with corresponding notches through which the tongues 93 are adapted to loosely engage.

Referring now to Figure 14, there is disclosed a modified form of jamb liner embodying a pair of spaced plates 94 and 95 connected together by a U-shaped member 96 which projects inwardly from plates 94 and 95. Plate 94 is formed with an inner stop member 97 and plate 95 is formed with an outer stop member 98. Channel member 96 forms an intermediate stop member against which one side 99 of an angle member 100 is adapted to be tightly clamped. A block 101 is disposed between stop member 96 and stop member 97, and clamping screws 102 are threaded through block member 101. Block member 101 includes a longitudinal tongue 103 disposed between the outer edge of angle side 99 and the inner side of plate 94. Block 101 is adapted to be inserted from an opening formed in the adjacent right angularly disposed liner plate 94. Angle member 100 is adapted to have secured thereto a sash 104 which is a fragmentary or upper sash, with a conventional louver structure 105 disposed below sash 104.

Referring now to Figures 15 and 16, there is disclosed a jamb liner structure generally indicated at 106, which is similar to that shown in Figure 14 with the exception that the inner and outer stop members 107 and 108, respectively, are formed with notches 109 and 110, respectively, through which relatively short clamping block 111 shown in Figure 16 are adapted to be inserted. As shown in Figure 16, the angle member 100 may have secured thereto a channel member 112 and a window sash may be secured within the channel member 112.

In the event the window sash is to be raised or lowered, the angle member shown in Figure 17, indicated at 113, may be used. This angle member 113 is provided with openings 114 through which the bolts 115 extend and bear against a gasket 116. The bolts 115 are threaded through clamping blocks 117.

In use of this invention, where an old building is to be converted, the jamb liner shown in Figure 1 is used. The liner 22 is secured within the window opening and the grill 29 with shield 31 are secured to flange 28. The jalousie frame structure 35 is clamped against stop 33 by bolts 39. Where the jalousie 21 is applied to a relatively tall building, if any of the glass louvers should become broken, the broken pieces will be held against dropping by means of the shield 31 and the grill 29.

In the event a bomb attack is expected, the louvers 40 may be turned to open position as shown in Figure 1, wherein the outer edges of the louvers 40 bear tightly against the shield 31. In this manner, the louvers will reinforce the shield so that the outer pressures will not collapse the shield. The mounting of the grill 29 and the shield 31 will prevent any of the "fall-out" material from entering the building. In this manner, the mounting of the invention in window openings of either old or new buildings, will provide a protecting means for protecting the occupants of the buildings against any radioactive fall-out material.

Having thus described the invention, what is claimed is:

1. A jamb liner for mounting in a window opening comprising a rectangular metal frame having each side thereof formed of a flat plate, an intermediate stop extending from said plate, an inner stop extending from said plate, an outer right angular flange extending from said plate, a grill confronting said flange, an imperforate shield confronting said grill, a gasket between said grill and said shield, means securing said grill and shield to said flange, a jalousie structure, a block between said jalousie structure and said inner stop, and a clamping screw threaded through said block for securing said jalousie structure tightly against said intermediate stops.

2. A jamb liner for mounting in a window opening comprising a rectangular metal frame having each side thereof formed of a flat plate, an intermediate stop extending from said plate, an inner stop extending from said plate, an outer right angular flange extending from said plate, a grill confronting said flange, an imperforate shield confronting said grill, a gasket between said grill and said shield, means securing said grill and shield to said flange, a jalousie structure including a frame having a flange confronting said intermediate stop, a block between said latter flange and said inner stop, and a screw threaded through said block for placing said block and latter flange under pressure.

3. A jamb liner for mounting in a window opening comprising a rectangular metal frame having each side thereof formed of a flat plate, an intermediate stop extending from said plate, an inner stop extending from said plate, an outer right angular flange extending from said plate, a grill confronting said flange, an imperforate shield confronting said grill, a gasket between said grill and said shield, means securing said grill and shield to said flange, a jalousie structure including a frame having a flange confronting said intermediate stop, clamping means between said inner stop and confronting said latter flange, and a compressible gasket between said clamping means and said intermediate stop.

References Cited in the file of this patent

UNITED STATES PATENTS

| 2,249,386 | Jones | July 15, 1941 |
| 2,256,548 | Chaffee | Sept. 23, 1941 |
| 2,633,612 | Woodhams | Apr. 7, 1953 |